United States Patent

Maguire

[11] Patent Number: 6,111,206
[45] Date of Patent: Aug. 29, 2000

[54] APPARATUS AND METHOD FOR GRAVIMETRIC BLENDING WITH HORIZONTAL MATERIAL FEED

[76] Inventor: Stephen B. Maguire, 1549 E. Street Rd., Glen Mills, Pa. 19342

[21] Appl. No.: 09/023,810

[22] Filed: Feb. 13, 1998

Related U.S. Application Data

[60] Provisional application No. 60/038,101, Feb. 15, 1997.

[51] Int. Cl.$^7$ .......................... G01G 13/00; G01G 13/02; G01F 11/10; G01F 11/00
[52] U.S. Cl. .......................... 177/60; 177/116; 177/119; 222/361; 222/409; 222/55
[58] Field of Search ................................. 222/55, 56, 77, 222/334, 361, 409; 141/83; 177/60, 89, 102, 103, 104, 105, 108, 111, 113, 114, 115, 116, 119, 120, 121, 122; 198/534; 366/193, 150.1, 154.1, 154.2

[56] References Cited

U.S. PATENT DOCUMENTS

| | | | |
|---|---|---|---|
| 2,161,190 | 6/1939 | Paull | 222/334 |
| 3,111,115 | 11/1963 | Best | 222/55 |
| 3,115,276 | 12/1963 | Johanningmeier | 222/55 |
| 3,209,898 | 10/1965 | Beebe et al. | 222/55 |
| 3,348,848 | 10/1967 | Lucking et al. | 222/55 |
| 3,470,994 | 10/1969 | Schnell et al. | 222/55 |
| 3,959,636 | 5/1976 | Johnson et al. | 235/151.33 |
| 3,985,262 | 10/1976 | Nauta | 220/349 |
| 4,026,442 | 5/1977 | Orton | 222/181 |
| 4,108,334 | 8/1978 | Moller | 222/136 |
| 4,148,100 | 4/1979 | Moller | 222/55 |
| 4,219,136 | 8/1980 | Williams et al. | 222/55 |
| 4,354,622 | 10/1982 | Wood | 222/55 |
| 4,402,436 | 9/1983 | Hellgren | 222/561 |
| 4,454,943 | 6/1984 | Moller | 198/657 |
| 4,475,672 | 10/1984 | Whitehead | 222/561 |
| 4,498,783 | 2/1985 | Rudolph | 366/132 |
| 4,525,071 | 6/1985 | Horowitz et al. | 366/152 |
| 4,581,704 | 4/1986 | Mitsukawa | 364/479 |
| 4,705,083 | 11/1987 | Rossetti | 141/104 |
| 4,756,348 | 7/1988 | Moller | 141/83 |
| 4,793,711 | 12/1988 | Ohlson | 366/18 |

(List continued on next page.)

FOREIGN PATENT DOCUMENTS

| | | |
|---|---|---|
| 0318170 | 5/1989 | European Pat. Off. . |
| 0507689 | 10/1992 | European Pat. Off. . |
| 0587085 | 3/1994 | European Pat. Off. . |
| 0743149 | 11/1996 | European Pat. Off. . |
| 2517087 | 9/1982 | France . |
| 3541532A1 | 11/1985 | Germany . |
| 4323295 | 2/1995 | Germany . |
| 2081687 | 2/1982 | United Kingdom . |

OTHER PUBLICATIONS

Sheet of 2 photographs of Mould–Tek gravimetric blender, circa 1993.
Sheet of 2 photographs of Motan gravimetric blender and feeding system with Maguire Products, Inc. controls, circa 1993.
Sheet of 3 photographs of UNA–DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.

(List continued on next page.)

*Primary Examiner*—Randy W. Gibson
*Attorney, Agent, or Firm*—Charles N. Quinn, Esq.

[57] ABSTRACT

A method and apparatus of supplying material from a storage hopper (12) to a weighing hopper (16) where the material is fed at a controllable rate by a sliding plate member (104) that acts as a shutter for the storage hopper (12), which includes an aperture (154) for receiving material gravity fed from the storage hopper (12). As the plate (104) is reciprocated horizontally at a preselected frequency, material is conveyed at a controlled rate from the storage hopper (12) to the weighing hopper (16).

18 Claims, 3 Drawing Sheets

U.S. PATENT DOCUMENTS

| | | | |
|---|---|---|---|
| 4,830,508 | 5/1989 | Higuchi et al. | 366/152 |
| 4,848,534 | 7/1989 | Sandwall | 366/196 |
| 4,850,703 | 7/1989 | Hanaoka et al. | 366/160 |
| 5,110,521 | 5/1992 | Moller | 222/55 |
| 5,116,547 | 5/1992 | Tsukahara et al. | 264/1.1 |
| 5,132,897 | 7/1992 | Allenberg | 177/59 |
| 5,143,166 | 9/1992 | Hough | 177/128 |
| 5,148,943 | 9/1992 | Moller | 222/1 |
| 5,172,489 | 12/1992 | Moller | 34/32 |
| 5,225,210 | 7/1993 | Shimoda | 425/145 |
| 5,252,008 | 10/1993 | May, III et al. | 406/23 |
| 5,261,743 | 11/1993 | Moller | 222/55 |
| 5,285,930 | 2/1994 | Nielson | 177/121 |
| 5,340,949 | 8/1994 | Fujimura et al. | 177/25.18 |
| 5,341,961 | 8/1994 | Hausam | 222/217 |
| 5,423,455 | 6/1995 | Ricciardi et al. | 222/1 |
| 5,651,401 | 7/1997 | Cados | 222/361 |
| 5,767,453 | 6/1998 | Wakou et al. | 177/103 |
| 5,767,455 | 6/1998 | Mosher | 177/64 |
| 5,780,779 | 7/1998 | Kitamura et al. | 177/105 |
| 5,843,513 | 12/1998 | Wilke et al. | 222/409 |

OTHER PUBLICATIONS

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solutions . . . Priced Right!" by HydReclaim, circa 1993.

Advertisement entitled "New from HydReclaim—Now Processors Can Economically Achieve Continuous Gravimetric Blending" by HydReclaim, circa 1993.

Article entitled "Control Loading Systems" from *Plastics Technology,* Oct. 1995, p. 41.

Advertisement "Introducing our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two–sided flyer entitled "GB 140 Series Compact Auto Weigh Blender" published by Conair Franklin in the United States, Jun., 1994.

Six page brochure entitled "Graviblend Precise Continuous Weigh Blenders" published by Ktron Vertech, Jun., 1991, United States.

Six page brochure entitled "Piovan Gravimetric Blenders MDW" published by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thiryt–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Molders and Extruders: published by Maguire Products, Inc., 1995".

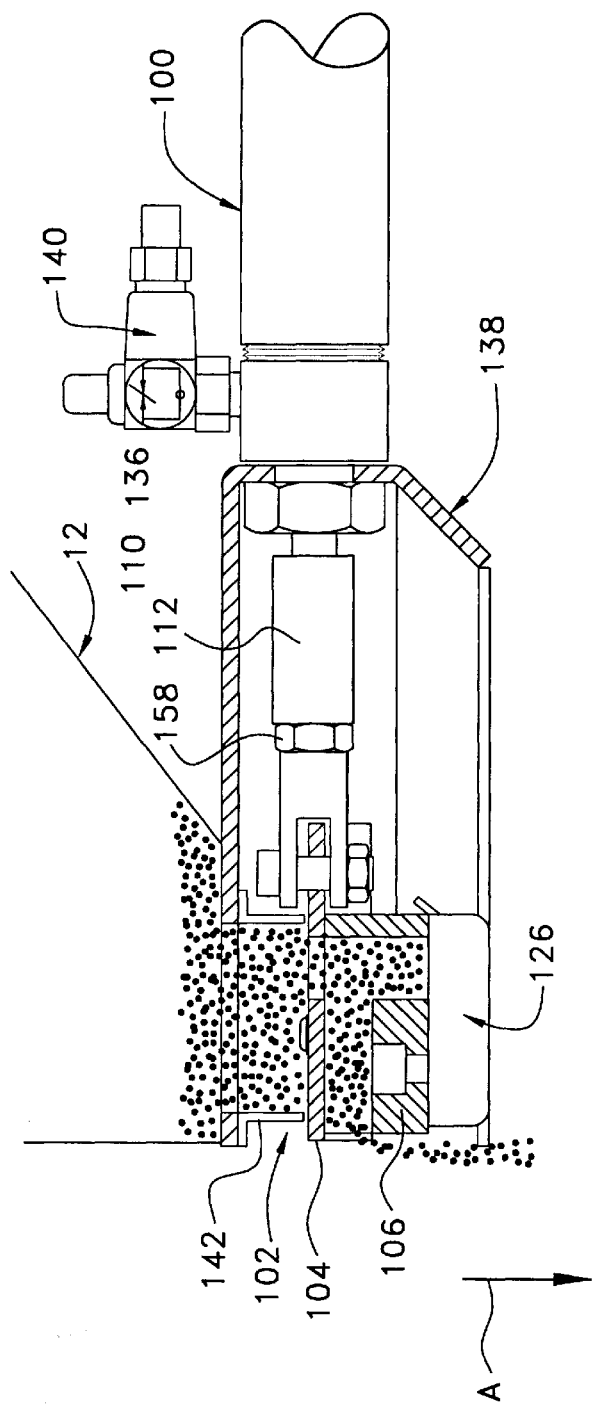
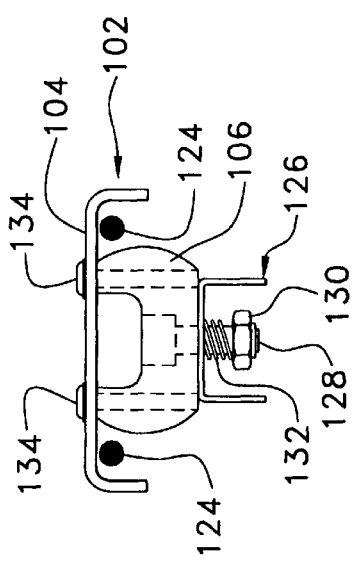

APPARATUS AND METHOD FOR GRAVIMETRIC BLENDING WITH HORIZONTAL MATERIAL FEED

This application claims benefit of provisional application 60/038101, filed Feb. 15, 1997.

BACKGROUND OF THE INVENTION

This invention relates generally to methods and apparatus for providing precisely measured amounts of granular materials preparatory to further processing of the combined granular materials and specifically to weigh scale blenders for providing such precisely measured amounts of plastic resin material and mixing these component amounts prior to supplying the resulting blended mixture to plastics manufacturing and processing equipment such as plastic injection molding, compression molding and extrusion equipment.

FIELD OF THE INVENTION AND DESCRIPTION OF THE PRIOR ART

The modern weigh scale blender was essentially originated by the applicant of this invention, has been widely copied and is used throughout the world by industries concerned with precision feeding of granular material, especially plastic resin material.

Weigh scale blenders used in the plastics industry blend solid plastic resin material components and additives, by weight, in batches. Typically batches of plastic resin material may consist of several solid material components. One of these may be "regrind", consisting of ground plastic resin which had previously been molded or extruded and which either resulted in a defective product or was excess material not used in forming the desired product.

Another component may be "natural" plastic resin which is virgin in nature in the sense that it has not previously been processed into a molded or extruded plastic part.

Yet another component may be a solid color material, typically flaked pigments on wax carriers or freeze dried material or even pigment powder, to produce a desired color of the finished plastic part.

Still yet another component may be an additive used to adjust the blend to provide required performance characteristics during molding, extrusion or subsequent processing.

The weigh scale blender as originated by the applicant and as copied and used widely throughout the world typically includes hoppers for each of the components of the solid material to be blended together. Typically several hoppers or several compartments in a single hopper may be provided, such as one compartment for "regrind" material, one compartment for "natural" material, one component for solid color additive material and one compartment for "additive".

When the weigh scale blender operates, the unit desirably operates automatically in response to a controlling microprocessor, adding each of the component solid materials in the proper, desired percentages. Each solid material component is dispensed into a single weigh bin. Once the proper amounts of each component have been serially dispensed into the weigh bin, all of the components are dropped together into a mixing chamber from the weigh bin.

Mixing is performed, preferably continuously, and preferably even as additional components are dispensed into the weigh bin and even also as additional batches of components are supplied to the mixing chamber. When mixing is complete, the resulting blend is preferably provided directly to the desired molding or extrusion machine.

The microprocessor facilitates feedback control of the dispensed amounts of each solid material component provided to the weigh bin and measured by weight. In the event of an error in the amount of a dispensed component, the succeeding batch is adjusted to account for the error detected in the preceding batch of blended material.

SUMMARY OF THE INVENTION

In one of its aspects this invention provides a weigh scale blender including a frame, a hopper supported on the frame, a weigh bin below the hopper and load sensing means mounted on the frame for sensing weight of the bin including material contained within the bin.

The weigh scale blender further preferably includes preferably pneumatic piston-actuated means, preferably positioned between the hopper and the weigh bin, for receiving material from the hopper and reciprocatingly metering material downwardly meter towards the weigh bin. A mix chamber preferably below the weigh bin preferably includes mixing means therewithin.

The weigh scale blender preferably further includes pneumatically actuated means for releasing material within the bin into the mix chamber.

A motor preferably rotates the mixing means in the mix chamber.

In another of its aspects this invention embraces a method for preparing plastic resin material for manufacturing processing such as molding or extrusion. The method includes serially metering respective solid resinous materials to the weigh station with at least one of the solid resinous materials being horizontally reciprocatingly metered to the weigh station until pre-selected weights of the respective materials are at the weigh station. The method further includes providing the serially metered solid materials unitarily to a mixing station. The method further embraces mixing the unitarily supplied serially metered solid granular materials into a blend preparatory to manufacturing processing via molding or extrusion.

The monitoring and the control of the horizontal reciprocation is preferably performed continuously and digitally using a microprocessor.

In yet another of its aspects this invention provides a method for furnishing granular plastic resin material pellets at an adjustably preselected controlled weight to a weigh station prior to manufacturing processing such as molding or extrusion. This method provides a granular flow of the material to an upwardly facing surface of the laterally reciprocable material vertical support member. The member is laterally reciprocated in a desired direction of material travel at a frequency to induce travel of the material along the upwardly facing surface of the reciprocable member at a controlled weight to a mixing station. Thereafter the material is mixed into a blend preparatory to manufacturing processing via molding or extrusion.

BRIEF DESCRIPTION OF THE DRAWINGS

FIG. 2 is an enlarged broken sectional view of a valve portion of the weigh scale blender illustrated in FIG. 1.

FIG. 3 is a view of the apparatus illustrated in FIG. 2 taken looking from left to right in FIG. 2.

DESCRIPTION OF THE PREFERRED EMBODIMENT AND BEST MODE KNOWN FOR PRACTICING THE INVENTION

Figure 1:
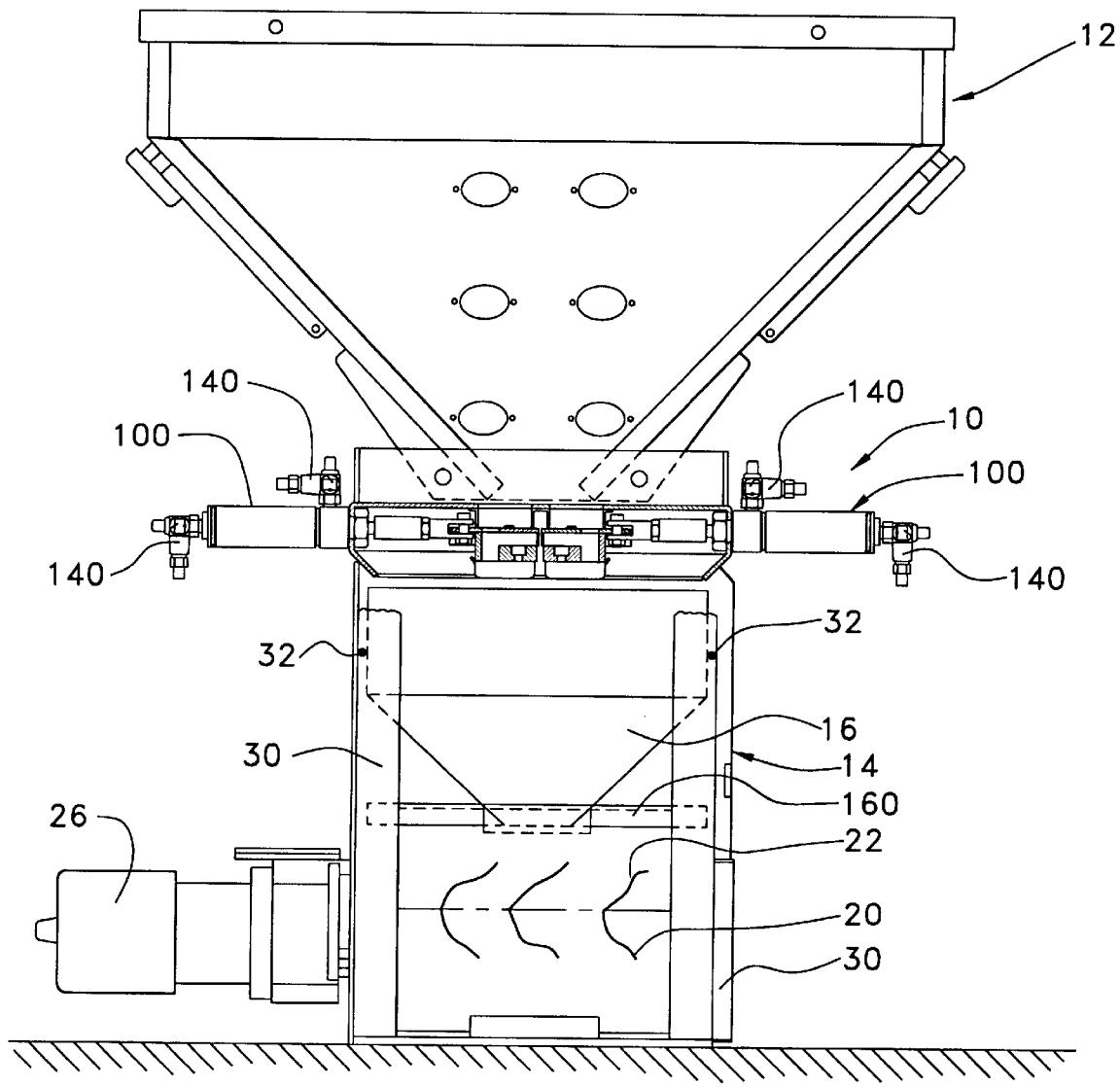
FIG. 1 is a side elevation of a weigh scale blender manifesting aspects of the invention.

Referring to the drawings and to FIG. 1 in particular, a weigh scale blender is indicated generally 10.

The weigh scale blender is designated generally 10 and includes a hopper, designated generally 12, supported by a frame designated generally 14 which holds a weigh bin 16 into which portions of plastic resin material are metered and weighed prior to release into a mix chamber as described below. Frame 14 preferably includes four upstanding members, which are preferably steel angle iron and are identified 30 with two of upstanding members 30 being illustrated in FIG. 1. Frame 14 preferably further includes webs connecting upstanding members 30 together to provide rigidity for frame 14. These webs have not been illustrated in the drawings.

Hopper 12 preferably has multiple internal compartments, as illustrated, so that a plurality of different solid resinous materials may be dispensed from hopper 12 into weigh bin 16.

Positioned within and preferably slidably retained in place by frame 14 below weigh bin 16 is a mix chamber 20 having a mixing means which is preferably in the form of a mixing agitator 22 rotatably disposed therewithin. Agitator 22 is mounted for rotation about an axis preferably shared with a drive motor 26. Motor 26 preferably has its drive shaft positioned to drive mixing agitator 22 about a common axis. Drive motor 26 is preferably supported by a cantilevered support extending laterally from an upstanding member 30 of frame 14.

Weight of material in weigh bin 16 is preferably sensed by one or more load cells 32 which are preferably connected to a microprocessor control means which is not illustrated in the drawings and which regulates operation of the weigh scale blender 10 through electrical connection with the load cells, the solenoid actuators for the solenoid valves, the motor and the like.

The microprocessor provides control of weigh scale blender 10 by monitoring, preferably on a continuous basis, weight of material, if any, at a weighing station defined by weigh bin 16. By sensing weight of weigh bin 16 and any material contained within weigh bin 16, the microprocessor serially meters respective components of solid granular resinous material to the weighing station defined by weigh bin 16 until a pre-selected weight of each of the respective components has arrived at the weigh station.

The microprocessor, through monitoring weight of the weigh bin and material therewith, adds the respective components of granular material to the weigh bin until a pre-selected weight of material is defined by the collective components in weigh bin 16.

Blender 10 preferably operates by blending components by weight based on settings which are preferably shown on a master controller portion of the microprocessor. Blending is desirably done in batches of 2,000, 4,000, 9,000 or 18,000 grams, depending on the amount desired. Each component is preferably dispensed separately into weigh bin 16 and then all components are dropped together into mixing chamber 20.

Blender 10 is designed to mount directly over the feed throat of a process machine used to mold or extrude plastic material with blender 10 being bolted or otherwise fixedly connected to the process machine.

When materials are being blended, typically regrind material is dispensed first according to the percent of regrind material required. If no regrind material or a limited amount of regrind material is present, then portions of natural material, solid color material and additive material are respectively increased to bring about a full batch weight.

Natural material is typically added second. The amount of natural material added is preferably calculated by the microprocessor to leave exactly the right amount of room in the mix chamber for solid color material and additive material. Once the natural material fill portion of the cycle has been completed, the exact weight of the natural material that has been actually dispensed is determined to detect any errors. Based on this actual weight of natural material dispensed, color additive in the form of solid color additive material is metered into the weigh bin and then other solid additive materials are metered into the weigh bin in the same manner. All components are then dumped into the mixing chamber which is preferably continuously running.

The microprocessor provides the serially metered components unitarily to a mixing station defined by mix chamber 20, by opening weigh bin 16 thereby to permit the materials vertically supported thereby to fall downwardly into the mix chamber. Weigh bin 16 is preferably opened by a pneumatic piston-cylinder combination designated generally 160, which is controlled by the microprocessor and is illustrated only schematically in the drawings for clarity. The pneumatic piston-cylinder combination is connected to weigh bin 16 so that weigh bin 16 opens responsively to movement of the piston member of this piston-cylinder combination 160.

In mix chamber 20 the solid material components which have been preferably unitarily supplied and serially metered to weigh bin 16 are mixed into a blend preparatory to being supplied to the manufacturing processing machine such as a molding press or an extrusion machine.

Desirably, monitoring of weight of material at the weighing station is performed continuously by the microprocessor continuously digitally sensing signals supplied by one or more load cells which are depicted schematically in FIG. 1 and identified generally 32 therein; the load cell(s) is/are interposed between and connected to weigh bin 16 and frame 14. Weigh bin 16 is suspended by and from the one or more load cells 32 with respect to frame 14. Depending on the size of weigh bin 16, a single load cell or multiple load cells may be used.

Figure 4:
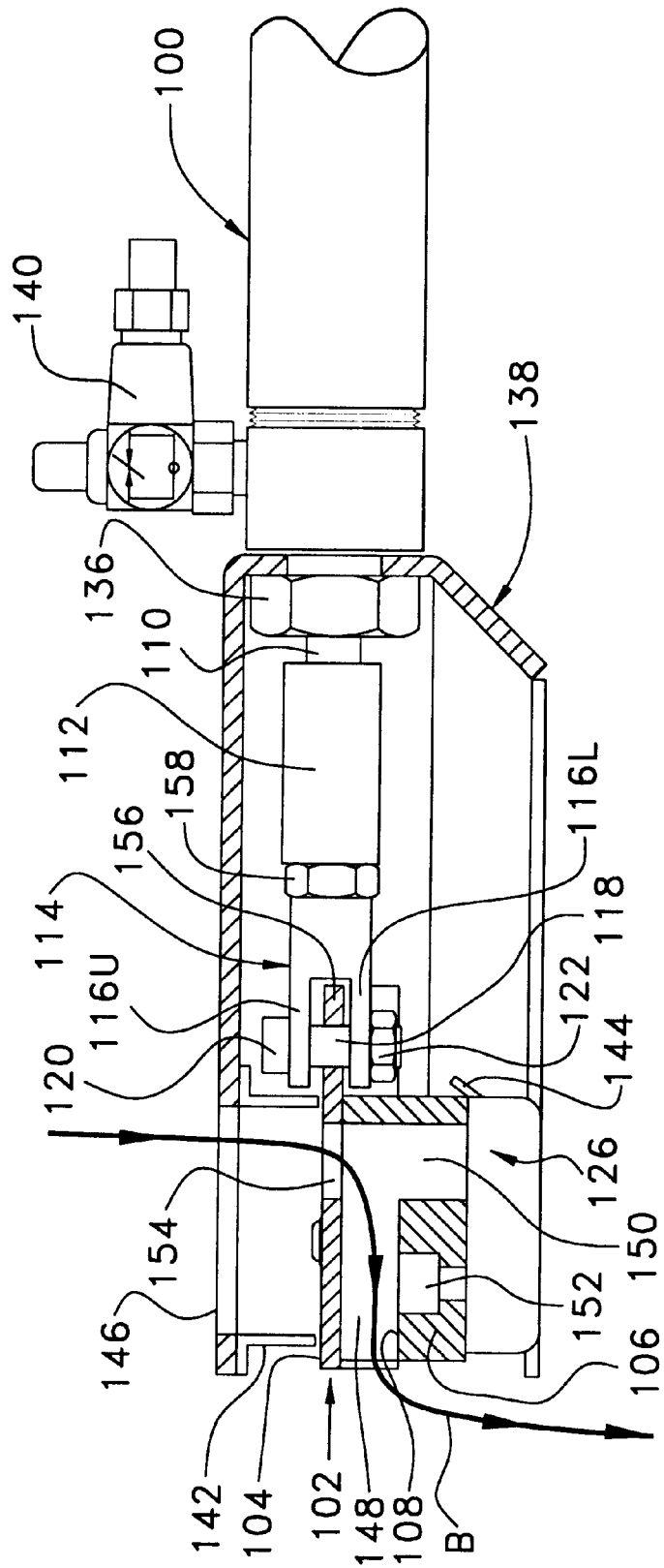
FIG. 4 is am enlarged broken sectional view similar to FIG. 2 schematically illustrating flow of granular material through the valve portion of the weigh scale blender illustrated in FIGS. 1 through 4.

Referring to FIGS. 2, 3 and 4 of the drawings, one or more valves designated generally 102 are positioned below hopper 12 and above weigh bin 16 to meter granular material from hopper 12 to weigh bin 16. Valve 102 meters the material by horizontal reciprocation.

Valve 102 includes an in-flow regulating plate 104 which has a downward material flow regulating aperture 154 formed therein. Plate 104 is mounted on a body 106 of valve 102 with plate 104 resting on unnumbered upwardly facing vertical extremity surfaces of body 106. These upper extremity surfaces are in facing contact with the downwardly facing surface of in-flow regulating plate 104 as illustrated in FIG. 3. Plate 104 is secured to body 106 by a pair of lead screws 134, as illustrated in FIG. 3.

Body 106 is preferably formed of solid plastic material and includes a horizontal material flow passageway 148 illustrated in FIGS. 2, 3 and 4. The bottom of horizontal material flow passageway 148 is defined by an upwardly facing surface 108 of body 106. Body 106 further has formed therein a vertical material clean-out passageway 150 which is preferably positioned immediately below and in communication with downward material flow regulating aperture 154 in plate 104, as illustrated in FIGS. 2 and 4.

Formed along a central portion of horizontal material flow passageway 148 is receptacle 152, shaped for receipt of a cap screw therewithin.

Further forming a portion of valve 102 is a clean-out port cover designated generally 126. Cover 126 is of generally U-shaped configuration, with the legs of the "U" facing downwardly as illustrated generally in FIG. 3. Cover 126 is in facing contact with the downwardly facing surface of body 106 and provides a movable closure for vertical material clean-out passageway 150 as illustrated in FIGS. 2 and 4.

Cover 126 is secured in place against the bottom of body 106 by a cap screw 128 having a nut 130 in threaded engagement therewith and a coil spring 132 interposed between nut 130 and the cover 126. The spring bias provided by spring 132 permits cover 126 to be manually rotated about the axis defined by cap screw 128, to open vertical material clean-out passageway 150, and permit downward material flow through passageway 150 thereby permitting material to be evacuated from hopper 12 and valve 102 via manual operation.

Valve 102 preferably rests on two support rods 124 which are fixed to frame 14 of weigh scale blender 10 in cantilever fashion. Vertical support provided by rods 124 permits valve 102 to reciprocate horizontally.

A housing 138 for valve 102 and the associated structure is positioned along the bottom of hopper 12 and is fixedly connected to frame 14.

A piston-cylinder combination designated generally 100 is fixedly connected to housing 138 and hence to frame 14 and is positioned in housing 138 such that a shaft 110, which is fixedly connected to the internal piston of the piston-cylinder combination 102, is substantially aligned with an extended tab portion 156 of flow regulating plate 104 of valve 102.

A clevis 114 includes a threaded bore, not illustrated in the drawings, to threadedly engage a threaded end of shaft 110 remote from piston-cylinder combination 100. A nut 158 is also in threaded engagement with the threaded end of shaft 110 remote from piston-cylinder combination 100. A bushing 112 is mounted on shaft 110 and is essentially in facing complemental contact with nut 158.

Piston-cylinder combination 100 is retained in place and fixedly connected to housing 138 by a nut 136 which threadedly engages an externally threaded shoulder or collar. The shoulder or collar extends axially from piston-cylinder combination 100 through an aperture of suitable size in housing 138. Shaft 110, extending from the piston of piston-cylinder combination 102, passes slidably through nut 136.

In FIGS. 2 and 4, shaft 110 extending from the piston of piston-cylinder combination 102 is illustrated in an extended position, in the direction of maximum travel to the left in FIGS. 2 and 4. Hence, valve 102 is illustrated at the left extreme of its reciprocating travel as effectuated by reciprocation of shaft 110 responsively to movement of the piston in piston-cylinder combination 100.

Rightward travel of valve 102 is limited by interfering contact of bushing 110 with nut 136.

As the piston in piston-cylinder combination 100 is moved left and right, shaft 110 moves clevis 114, which in turn moves flow regulating plate 104 and body 106 of valve 102, with a horizontally reciprocating motion.

Clevis 114 is connected to tab extension portion 156 of plate 104 by a pin 118 having a head 120. Pin 118 is secured in place by a nut 122; pin 118 passes through suitable apertures in upper and lower arms 116U, 116L of clevis 114 and a corresponding aperture in tab extension portion 156 of plate 104. The pivotal connection between shaft 110 and flow regulating plate 104 of valve 102 provided by clevis 114 and pin 118 allows for variability in dimensions when the component parts of valve 102 are assembled and positioned together with the remainder of blender 10; the pivoting arrangement also provides some desirable "play" during reciprocation of valve 102.

During operation preferably the piston of piston-cylinder combination 100 reciprocates valve 102 only about one-eighth (⅛) of an inch. Preferably horizontal material flow passageway 148 is about three-fourths (¾) of an inch in length, from left to right in the drawings. Hence, reciprocation of valve 102 and specifically of body 106 is through about sixteen percent of the total length of the horizontal material flow passageway 148 with each stroke of piston-cylinder combination 100.

From two to four cycles of the piston of piston-cylinder combination 100 per second seem to provide optimum operation.

The piston of piston-cylinder combination 100 is actuated by a solenoid driven pneumatic valve.

Concerning timing of supply of air to piston-cylinder combination 100 to actuate travel of the piston, enough time must be allowed for the poppet in the solenoid to shift and to have the air exhaust from the cylinder portion of piston-cylinder combination 100. There is a certain minimum time for these operations to occur. If the microprocessor endeavors to actuate the valve and piston faster than this, nothing moves.

In a preferred practice the valve which supplies air to piston-cylinder combination 100 is actuated by the microprocessor every fifty (50) interrupts during microprocessor operation. In a preferred practice fifty (50) interrupts equals one-fifth (⅕) of a second. Hence, the piston of piston-cylinder combination is shifted to the left for one-fifth (⅕) of a second and then to the right for one-fifth (⅕) of a second in the preferred practice.

It is further preferable to reciprocate valve 102 somewhat softly. This is accomplished by reducing air flow rate from the cylinder portion of piston-cylinder combination 102. Air flow rate from the piston-cylinder combination 102 upon exhaust is provided by pneumatic exhaust flow regulators 140 connected to piston-cylinder combination 102, as illustrated if FIG. 1.

In practice it has been found that the size of the material granules is not an important factor. The apparatus and the method can be used to meter granular materials as fine as sugar and salt.

The reciprocating valve apparatus and the method provide much more accurate metering than slide gates, which have been used with gravimetric blenders heretofore. Pneumatically actuated slide gates are accurate in providing material flows of plus or minus two to three grams on the average; even the best slide gates can control delivery of material to an accuracy of only one to two grams.

Contrasting, this apparatus and method are accurate in providing material delivery rates to plus or minus one-tenth (1/10) of a gram. This is typically about the weight of four plastic resin material pellets. Each dispense cycle of operation of the apparatus and method provides dispensing of about five pellets of plastic resin material. Hence the dispense rate is about one gram of material per second. The higher accuracy results in provision of a more precise blend to the plastic molding or extruding equipment, with consequent production efficiencies, which are desirable.

Auger feeders, which have been the preferred means heretofore for providing highly accurate metering at necessarily low flow rates, also dispense plastic resin material to about 1 gram per second. However, augers are substantially more expensive than the reciprocating valve apparatus disclosed herein. Moreover, the reciprocating valve apparatus is not only less expensive to manufacture than an auger, the reciprocating valve apparatus has higher reliability since there is no motor involved in moving the valve and the valve does not have many parts. Additionally, the valve apparatus is easily retrofitable to existing blenders.

The plastic resin materials typically metered using the apparatus and method disclosed herein are typically one-eight (⅛) inch diameter cylinders or spheres. The material is provided is a granular mixture with about three-sixteenths (3/16) inch maximum diameter of the pellet or spheres and about one-sixteenth (1/16) inch minimum diameter.

When metering plastic material this type, no shut-off valve is needed. Material flow stops on its own when reciprocation of the valve member halts.

The normal pneumatic pressure for the piston-cylinder combination is eighty (80) pounds per square inch gauge.

The reciprocating granular material metering valve 102 may be provided in a blender to control material flow from one (1) or two (2) hoppers, or compartments in a hopper, with slide gates being used to control flow of material from the remaining compartments of a hopper. Typically the horizontally reciprocating granular material metering valve 102 would be used to meter expensive materials such as color additives. Less expensive materials might be metered using conventional slide gates.

When slide gates are used, the microprocessor actuates solenoid controlled preferably pneumatic valves to provide pneumatic pressure via suitable conduits to the piston-cylinder slide gate combinations. These solenoid valves are actuated by the microprocessor and are each individually connected via two suitable conduits, which are preferably flexible plastic tubing, to associated individual piston-cylinder slide gate combinations, to open and close individual slide gates by application of pneumatic pressure to an appropriate side of a piston portion of a piston-cylinder combination, in the same manner as the operation of piston-cylinder combination 100.

Each solenoid valve, specifically the core of the solenoid, is spring-biased towards a position corresponding to that at which the piston member of a piston-cylinder slide gate combination associated with a given solenoid valve is at a preferred position, referred to as the default position, for operation. When due to a change in operational factors such as removal of a blended batch from mix chamber 20, need for additional material in weigh bin 16, commencement of a loading cycle or the like, the microprocessor senses that it is required to actuate a given piston of a piston-cylinder slide gate combination. One example might be to open one of the compartments within hopper 12 to add an amount of component material in that compartment to weigh bin 16. In such case the microprocessor actuates the solenoid valve associated with the given piston-cylinder slide gate combination of interest thereby moving the piston member of the appropriate piston-cylinder slide gate combination from the default position to a position at which a given hopper slide gate is open or other desired action has been taken.

Each solenoid valve generally includes a valve member and a solenoid actuator. Suitable wiring leads from the solenoid actuator to the microprocessor.

Each solenoid includes a core member which when actuated due to voltage being applied to an associated coil, moves axially respecting the coil and actuates the associated valve member against the bias of a spring which continuously urges the core towards the default position.

When one or more slide gates are used, the solenoid actuated valves function to move pistons within air cylinders by pressurizing one side of a piston and opening the other side to the atmosphere. There is no vacuum involved, just pressure above atmospheric pressure and ambient atmospheric pressure.

The valves, whether used to actuate reciprocating granular material metering valve member 102 via piston-cylinder combination 100 or one or more piston-cylinder combinations operating conventional slide gates, are preferably four-way solenoid valves, meaning that each valve has four ports. These are a pressure port, an exhaust port and two function ports which are connected to the given air cylinder of interest by the flexible plastic tubing. The pressure and exhaust ports are connected to air pressure and ambient atmosphere respectively by way of a manifold which is drilled to provide common pressure and exhaust ports for all of the solenoid actuated valves.

The valve in its normally at rest or default state connects pressurized air to an "A" port and ambient air to a "B" port. When the valve is energized the A port is switched to ambient air and the B port is switched to the pressurized air. Two air lines preferably connect each solenoid actuated valve to a given air cylinder with one solenoid actuated valve being provided for and connected to each air cylinder.

When one or more slide gates are used, at rest or default, a piston within a given air cylinder is preferably extended so that the slide gate actuated by the piston is closed. When the associated valve is energized, the piston retracts, the associated slide gate opens and material in the hopper is dispensed downwardly.

Solenoid actuated valves are preferably also used to operate the weigh bin dump by actuating piston-cylinder combination 160 and further may be used to operate an optional flow control valve serving the shutoff and exit opening at the bottom of the blender. If the blender is fitted with such a flow control at the bottom, the flow control valve may hold material in the chamber for a time period for better mixing.

Each solenoid valve preferably has associated therewith a pair of pneumatic conduits, each of which is connected to a manifold. One of the pneumatic conduits preferably leads to a pressurized air inlet portion of the manifold. Similarly, a second one of pneumatic conduits associated with a given solenoid valve is an unpressurized, ambient air conduit and communicates with an exhaust portion of the manifold.

A given solenoid valve operates to connect either positive air pressure, as received by a pneumatic conduit communicating with a pressurized air inlet or ambient pressure as present in a pneumatic conduit communicating with the exhaust or ambient portion of the manifold to default and signal conduits respectively.

The solenoid valves their associated solenoid actuators are preferably maintained within an enclosed housing which is preferably of sheet metal construction and can be constructed from multiple pieces secured together by nut and bolt combinations, by sheet metal screws or by other means.

The following is claimed:

1. A method for providing granular plastic resin material pellets at an adjustably preselected controlled rate to a weigh station prior to manufacturing processing, comprising the steps of:

a. providing a granular flow of said material to an upwardly facing surface of a laterally reciprocable material vertical support member;

b. laterally reciprocating said member in a desired direction of material travel at a frequency to induce material travel along said upwardly facing surface of said reciprocable member at said controlled rate to a mixing station;

c. mixing said material into a blend preparatory to said manufacturing processing via molding or extrusion.

2. A method for preparing granular plastic resin material pellets for manufacturing processing, comprising the steps of:

a. monitoring weight of material, if any, at a weighing station;

b. providing a downwardly directed granular flow of said pellets to an upwardly facing surface of the horizontally reciprocal member having transverse length, in the direction of desired pellet horizontal movement, at least five times average cross-sectional dimension of said pellets;

c. reciprocating said horizontal member in the direction of desired horizontal travel of said pellets through a stroke length substantially the average diameter of said pellets thereby encouraging horizontal travel of said pellets along said upwardly facing surface through a distance about at least about five times average diameter of said pellets to where said pellets drop vertically from said horizontal member to a mixing station;

d. mixing said pellets together with other resin material components into a blend preparatory to said manufacturing processing via molding or extrusion.

3. A method for preparing plastic resin material for manufacturing processing, comprising the steps of:

a. monitoring weight of material, if any, at a weighing station;

b. serially horizontally reciprocatingly metering solid resinous material to said weighing station until preselected weights of materials are at said station;

c. providing said serially metered materials unitarily to a mixing station;

d. mixing said unitarily supplied serially metered materials into a blend preparatory to said manufacturing processing via molding or extrusion.

4. The method of claim 3 wherein said metering further comprises horizontally reciprocating a member vertically supporting said resinous material in a direction of vertical support member horizontal elongation.

5. The method of claim 4 wherein said reciprocation is performed responsively to a preselected number of interrupts of a microprocessor.

6. The method of claim 5 wherein said horizontally reciprocating metering is performed by actuating a pneumatic piston.

7. The method of claim 4 wherein said metering is performed by reciprocating a horizontally elongated trough in the direction of trough horizontal elongation.

8. The method of claim 7 wherein said reciprocation of said horizontal trough is performed by actuating a pneumatic piston.

9. The method of claim 8 wherein said piston is actuated responsively to said performance of a fixed number of interrupts by said microprocessor.

10. A gravimetric blender comprising:

a. a frame;

b. a hopper supported on said frame;

c. a weigh bin below said hopper;

d. means for sensing weight of said bin and any material contained therein;

e. means for horizontally reciprocatingly metering material from said hopper to said bin; and f. a mix chamber below said bin including mixing means therewithin.

11. The blender of claim 10 wherein said metering means further comprises a vibrating horizontally elongated material vertical support member receiving material at one end thereof downwardly discharged from said hopper, for conveying said material horizontally along said vertical support member to a downward discharge position displaced along said support member from said receiving position.

12. The blender of claim 11 further comprising pneumatically actuated means for reciprocating said support member.

13. The blender of claim 12 further comprising microprocessor means for regulating operation of said blender and actuating said pneumatically actuated reciprocation means responsively to occurrence of a preselected number of interrupts during operation of said microprocessor.

14. The blender of claim 11 wherein said support member includes a downwardly opening material discharge passageway for material cleanout.

15. The blender of claim 14 wherein said means for horizontally reciprocatingly metering material further includes a spring-loaded manually actuable door for selectably manually opening said downwardly opening cleanout passageway.

16. The blender of claim 10 further comprising means cantilevered from said frame for vertically supporting said horizontally reciprocating metering means with said metering means being slidably movable therealong.

17. The blender of claim 12 further comprising means pivotally connecting said pneumaticaly actuated means with said material support means.

18. A gravimetric blender comprising:

a. a frame;

b. a hopper supported on said frame;

c. a weigh bin below said hopper and connected to said frame;

d. a laterally reciprocable horizontally elongated valve, for receiving vertical flow of material from said hopper and laterally conveying said material at an adjustably selectable rate by horizontal valve reciprocation to a position at which material is discharged downwardly from said valve into a mix chamber;

e. pneumatically actuated means connected to said frame for reciprocating said valve in the direction of material lateral movement.

* * * * *